(12) United States Patent
Liu et al.

(10) Patent No.: US 10,116,431 B2
(45) Date of Patent: Oct. 30, 2018

(54) OPTICAL COMMUNICATION TRANSMITTING APPARATUS AND RECEIVING APPARATUS

(71) Applicant: KUANG-CHI INTELLIGENT PHOTONIC TECHNOLOGY LTD., Shenzhen (CN)

(72) Inventors: Ruopeng Liu, Shenzhen (CN); Weizi Huang, Shenzhen (CN); Weicheng Xu, Shenzhen (CN); Linyong Fan, Shenzhen (CN); Zhiwei Pan, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 0 days.

(21) Appl. No.: 15/661,082

(22) Filed: Jul. 27, 2017

(65) Prior Publication Data
US 2017/0324539 A1 Nov. 9, 2017

Related U.S. Application Data

(63) Continuation of application No. PCT/CN2016/072351, filed on Jan. 27, 2016.

(30) Foreign Application Priority Data

Jan. 27, 2015 (CN) .................. 2015 2 0057927 U
Mar. 20, 2015 (CN) .................. 2015 2 0161289 U
(Continued)

(51) Int. Cl.
H04B 10/50 (2013.01)
H04L 7/00 (2006.01)
(Continued)

(52) U.S. Cl.
CPC .......... H04L 7/0075 (2013.01); H04B 10/118 (2013.01); H04B 10/50 (2013.01);
(Continued)

(58) Field of Classification Search
CPC ..... H04L 7/0075; H04B 10/66; H04B 10/118; H04B 10/58; H04B 10/50; H04B 10/516
(Continued)

(56) References Cited

U.S. PATENT DOCUMENTS 5,530,322 A * 6/1996 Ference .................. H05B 37/02
315/293
5,959,413 A * 9/1999 Komarek .............. H04M 1/723
315/306
(Continued)

FOREIGN PATENT DOCUMENTS

CN 102800144 A 11/2012
CN 202918301 U 5/2013
(Continued)

*Primary Examiner* — Daniel Dobson
*Assistant Examiner* — Dibson Sanchez
(74) *Attorney, Agent, or Firm* — Perkins Coie LLP

(57) ABSTRACT

The present application relates to an optical communication transmitting apparatus and receiving apparatus. The optical communication transmitting apparatus includes: an encoder, configured to encode and shunt an input signal, to generate multiple synchronous encoded signals; a driver, configured to amplify the multiple encoded signals, to generate multiple drive signals; and multiple light sources, configured to generate multiple synchronous optical signals when driven by the multiple drive signals. The optical communication transmitting apparatus and receiving apparatus provided in the present application make full use of advantages of visible light communication, achieving a rapid communication speed and high security.

6 Claims, 10 Drawing Sheets

(30) Foreign Application Priority Data

| | | |
|---|---|---|
| Mar. 20, 2015 | (CN) | 2015 2 0163214 U |
| May 15, 2015 | (CN) | 2015 2 0317697 U |
| May 25, 2015 | (CN) | 2015 2 0341673 U |
| Oct. 27, 2015 | (CN) | 2015 2 0838691 U |

(51) Int. Cl.
*H04B 10/516* (2013.01)
*H04B 10/118* (2013.01)
*H04B 10/58* (2013.01)
*H04B 10/66* (2013.01)

(52) U.S. Cl.
CPC .......... *H04B 10/516* (2013.01); *H04B 10/58* (2013.01); *H04B 10/66* (2013.01)

(58) Field of Classification Search
USPC ........................................................ 398/182
See application file for complete search history.

(56) References Cited

U.S. PATENT DOCUMENTS

| | | | | |
|---|---|---|---|---|
| 6,046,550 A * | 4/2000 | Ference | H05B 37/02 | 315/291 |
| 6,057,949 A * | 5/2000 | Kinstler | F41G 7/007 | 398/103 |
| 7,598,684 B2 * | 10/2009 | Lys | H05B 37/0254 | 315/291 |
| 7,983,568 B2 * | 7/2011 | Won | H04B 10/116 | 398/172 |
| 8,208,818 B2 * | 6/2012 | Sasai | H04B 1/707 | 398/185 |
| 8,526,825 B2 * | 9/2013 | Yamada | H04B 10/116 | 398/128 |
| 9,607,189 B2 * | 3/2017 | Gardiner | G06K 7/10158 | |
| 2002/0178367 A1 * | 11/2002 | Hamid | G06F 21/32 | 713/186 |
| 2003/0028814 A1 * | 2/2003 | Carta | G07C 9/00039 | 726/21 |
| 2003/0057886 A1 * | 3/2003 | Lys | F21V 21/002 | 315/291 |
| 2004/0198382 A1 * | 10/2004 | Wong | H04B 1/3827 | 455/456.1 |
| 2004/0240890 A1 * | 12/2004 | Lys | F21V 21/002 | 398/182 |
| 2006/0059365 A1 * | 3/2006 | Harper | G06F 21/6245 | 713/186 |
| 2006/0067707 A1 * | 3/2006 | Maniam | H04B 10/1143 | 398/183 |
| 2006/0091223 A1 * | 5/2006 | Zellner | G06K 19/06206 | 235/492 |
| 2006/0193634 A1 * | 8/2006 | Wang | H04B 10/1141 | 398/118 |
| 2006/0239689 A1 * | 10/2006 | Ashdown | H04B 10/1141 | 398/130 |
| 2007/0220273 A1 * | 9/2007 | Campisi | G06K 9/00006 | 713/186 |
| 2007/0262724 A1 * | 11/2007 | Mednik | H05B 33/0818 | 315/125 |
| 2008/0001547 A1 * | 1/2008 | Negru | H02J 7/0065 | 315/189 |
| 2008/0120509 A1 * | 5/2008 | Simon | G06K 19/0718 | 713/186 |
| 2008/0223937 A1 * | 9/2008 | Preta | G06F 21/32 | 235/492 |
| 2009/0214225 A1 * | 8/2009 | Nakagawa | H04B 10/1149 | 398/191 |
| 2009/0273303 A1 * | 11/2009 | Peng | H05B 33/0818 | 315/297 |
| 2010/0034540 A1 * | 2/2010 | Togashi | H04B 10/116 | 398/118 |
| 2010/0067919 A1 * | 3/2010 | Ono | H04B 10/116 | 398/172 |
| 2011/0109228 A1 * | 5/2011 | Shimomura | H05B 37/0245 | 315/113 |
| 2012/0128366 A1 * | 5/2012 | Lee | H04B 10/1121 | 398/118 |
| 2012/0155889 A1 * | 6/2012 | Kim | H04B 10/116 | 398/193 |
| 2012/0299480 A1 * | 11/2012 | Peting | H05B 33/0815 | 315/113 |
| 2013/0200999 A1 * | 8/2013 | Spodak | G05B 1/01 | 340/5.65 |
| 2013/0279919 A1 * | 10/2013 | Yokoi | H04B 10/1149 | 398/183 |
| 2014/0006277 A1 * | 1/2014 | Rao | G06Q 20/341 | 705/41 |
| 2014/0178080 A1 * | 6/2014 | Chen | H04B 10/116 | 398/172 |
| 2015/0189714 A1 * | 7/2015 | Fathalla | H05B 33/0851 | 315/134 |
| 2015/0281905 A1 * | 10/2015 | Breuer | H04B 10/116 | 398/118 |
| 2015/0359063 A1 * | 12/2015 | Schoegler | H05B 33/0824 | 315/151 |
| 2016/0149645 A1 * | 5/2016 | Liu | H04B 10/116 | 398/135 |
| 2017/0213120 A1 * | 7/2017 | Bae | G06K 19/07 | |

FOREIGN PATENT DOCUMENTS

| | | |
|---|---|---|
| CN | 103291149 A | 9/2013 |
| CN | 203911929 U | 10/2014 |
| CN | 204463263 U | 7/2015 |
| CN | 204498130 U | 7/2015 |
| CN | 204578540 U | 8/2015 |
| CN | 204667496 U | 9/2015 |
| JP | 03-085933 A | 4/1991 |
| JP | 11-177399 A | 7/1999 |
| JP | 2008-136030 A | 6/2008 |
| WO | 2007080592 A1 | 7/2007 |

* cited by examiner

901

1001

OPTICAL COMMUNICATION TRANSMITTING APPARATUS AND RECEIVING APPARATUS

CROSS REFERENCE TO RELATED APPLICATIONS

The present application is a continuation of PCT Application No. PCT/CN2016/072351 filed on Jan. 27, 2016, which claims priority to Chinese patent application No. 201520057927.9 of Jan. 27, 2015; Chinese patent application No. 201520161289.5 of Mar. 20, 2015; Chinese patent application No. 201520163214.0 of Mar. 20, 2015; Chinese patent application No. 201520317697.5 of May 15, 2015; Chinese patent application No. 201520341673.3 of May 25, 2015; and Chinese patent application No. 201520838691.2 of Oct. 27, 2015, all of which are incorporated by reference.

TECHNICAL FIELD

The present application relates to the communication technology, and more specifically, to an optical communication transmitting apparatus and receiving apparatus.

BACKGROUND

The optical communication technology is a communication technology that uses light as a carrier to transmit a signal, including an optical fiber communication technology and a visible light communication technology. In the optical fiber communication technology, a laser diode or light-emitting diode is used as a light source, and optical fibers are used as a light transmission medium. In the visible light communication technology, a fluorescent lamp or light-emitting diode is used as a light source, and air is used as a light transmission medium. In both the optical fiber communication technology and the visible light communication technology, a transmitting apparatus needs to superimpose or modulate information on an optical carrier, so as to transmit a modulated optical signal, and a receiving apparatus demodulates the optical signal to obtain information.

In recent years, visible light communication has attracted increasing attention. A visible light communication device includes an optical communication transmitting apparatus used as a transmitting apparatus and an optical communication receiving apparatus used as a receiving apparatus. The visible light communication device modulates information into variation of intensity of an optical carrier, and transmits information by using a flashing light signal. Since the variation of intensity of an optical carrier has a high frequency, human eyes will not even feel light flashing. The visible light communication can use indoor lighting equipment rather than a wireless local area network (LAN) base station to transmit a signal, so that lighting and communication can be achieved at the same time. A communication speed of the visible light communication may reach tens to hundreds of megabytes per second. Uploading or downloading at a high speed can be implemented as long as light irradiation exists. The communication speed will not be affected even when multiple computers work at the same time. The visible light communication technology also features high security, and information leakage cannot occur as long as light is blocked.

SUMMARY

The present application provides an optical communication transmitting apparatus and receiving apparatus on the basis of a visible light communication technology.

According to a first aspect of the present application, an optical communication transmitting apparatus is provided, including:

an encoder, configured to encode and shunt an input signal, to generate multiple synchronous encoded signals;

a driver, configured to amplify the multiple encoded signals, to generate multiple drive signals; and multiple light sources, configured to generate multiple synchronous optical signals when driven by the multiple drive signals.

Further, the encoder includes:

a signal processing module, configured to perform analog-to-digital conversion and encoding on the input signal, and convert the input signal to an encoded signal; and a signal shunting module, configured to convert the encoded signal to the multiple synchronous encoded signals.

Further, the signal processing module includes:

an amplifier, configured to amplify the input signal;

an analog-to-digital converter, configured to convert the input signal to a digital signal; and a micro control unit, configured to encode the digital signal, to generate the encoded signal.

Further, the signal shunting module has a multistage NOT-gate cascade structure.

Further, in the signal shunting module, each encoded signal passes through the same number of NOT gates from an input end of a first-stage NOT gate to an input end of a corresponding NOT gate of a last-stage NOT gate.

Further, in the signal shunting module, the number of $K_{th}$-stage NOT gates is greater than that of $K-1_{th}$-stage NOT gates, each NOT gate in the $K-1_{th}$-stage NOT gates is connected to at least one NOT gate in the $K_{th}$-stage NOT gates, and K is an integer greater than 2.

Further, the optical communication transmitting apparatus is a photon card, and the photon card further includes:

a housing;

a circuit board fitted inside the housing; and a fingerprint collection module embedded in a surface of the housing; where the fingerprint collection module is connected to the circuit board;

after the fingerprint collection module collects a fingerprint, the circuit board drives the light sources to emit a light beam that carries user identity information; and the encoder, the driver, and the light sources are arranged on the circuit board.

Further, an indicator light is welded on the circuit board to indicate a working status of the photon card.

Further, a charging interface is welded on the circuit board.

Further, the optical communication transmitting apparatus further includes a positioning module and a wireless communication module, where the positioning module collects location information of the optical communication transmitting apparatus, and the wireless communication module transmits the location information collected by the positioning module.

Further, the optical communication transmitting apparatus further includes an emergency call module, where the emergency call module generates a distress signal and transmits the distress signal by using the wireless communication module.

According to another aspect of the present application, an optical communication receiving apparatus is provided, including: a photoelectric conversion circuit, where the photoelectric conversion circuit includes a primary amplifying circuit, a secondary amplifying circuit, and a comparison output circuit; the primary amplifying circuit is used to receive an optical signal and convert the optical signal to a voltage signal; the secondary amplifying circuit is connected in series to the primary amplifying circuit, and used to receive the voltage signal and amplify the voltage signal for output; and the comparison output circuit is connected in series to the secondary amplifying circuit, and used to receive an amplified voltage signal and shape the amplified voltage signal for output.

Further, the primary amplifying circuit includes:

a first operational amplifier, where the first operational amplifier has an in-phase input end, an anti-phase input end, and an output end, and receives single power VCC supply;

a photodiode, where an anode terminal of the photodiode is connected to the in-phase input end of the first operational amplifier, and both are grounded; and a cathode terminal of the photodiode is connected to the anti-phase input end of the first operational amplifier, an end of a first resistor, and an end of a first capacitor;

the first resistor and the first capacitor, where the first resistor and the first capacitor are connected in parallel between the anti-phase input end and the output end of the first operational amplifier.

Further, the secondary amplifying circuit includes:

a second operational amplifier, where the second operational amplifier has an in-phase input end, an anti-phase input end, and an output end, and receives single power VCC supply, and the in-phase input end receives voltage of VCC/2;

a second resistor, connected between the anti-phase input end and the output end of the second operational amplifier;

a second capacitor and a third resistor, connected in series between the output end of the first operational amplifier in the primary amplifying circuit and the anti-phase input end of the second operational amplifier; and a fourth resistor, connected between the voltage of VCC/2 and the in-phase input end of the second operational amplifier.

Further, the comparison output circuit includes:

a third operational amplifier, where the third operational amplifier has an in-phase input end, an anti-phase input end, and an output end, and receives single power VCC supply, the in-phase input end receives comparison voltage, and the anti-phase input end is connected to the output end of the second operational amplifier in the secondary amplifying circuit.

Further, the optical communication receiving apparatus is a light-controlled lock, where the light-controlled lock further includes a lock body;

the photoelectric conversion circuit sends the lock body an unlocking signal; and the lock body includes a locking bolt, a lock latch, and a driver, where the driver is connected to the locking bolt, and configured to drive the locking bolt to exit from the lock latch after receiving the unlocking signal.

Further, the optical communication receiving apparatus further includes a showcase, where the light-controlled lock is arranged on the showcase.

The optical communication transmitting apparatus and receiving apparatus provided in the present application have the following beneficial effects: advantages of the visible light communication are in full use, and a rapid communication speed and high security are achieved.

DESCRIPTION OF EMBODIMENTS

The present application is described below based on embodiments, but the present application is not limited to the embodiments. Some specific details are described in detail in the following detailed description of the present application. It will also be understood by those skilled in the art that the present application may be understood without reference to the details. To avoid obscuring the essence of the invention, well-known methods, processes, procedures, elements and circuits are not described in detail. In addition, it will be understood by those of ordinary skill in the art that the drawings provided herein are for the purpose of illustration and that the drawings are not necessarily to scale.

Unless otherwise clearly stated in the context, similar terms such as "including", "comprising" and the like in the entire specification and claims are to be construed in an inclusive sense as opposed to an exclusive or exhaustive sense, that is to say, in the sense of "including, but not limited to". In the description of the present application, terms such as "first", "second", and the like are used herein only for the purpose of description and are not intended to indicate or imply relative importance. In addition, in the description of the present application, the meaning of "multiple" is two or more unless otherwise specified.

Figure 1:
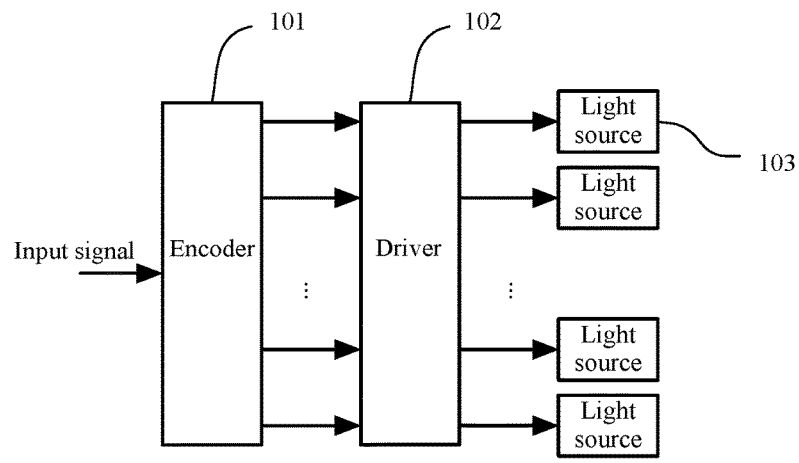
FIG. 1 is a structural block diagram of an optical communication transmitting apparatus according to a preferable embodiment of the present application.

FIG. 1 is a structural block diagram of an embodiment of an optical communication transmitting apparatus proposed by the present application. As shown in FIG. 1, the optical communication transmitting apparatus includes an encoder 101, a driver 102, and multiple light sources 103.

The encoder 101 is configured to encode an input signal, and shunt an encoded signal, to form multiple encoded signals, and output the multiple encoded signals to the driver 102. The driver 102 is configured to amplify the multiple encoded signals separately, and output amplified multiple encoded signals to corresponding light sources 103. The light sources 103 are configured to generate multiple synchronous optical signals when driven by the multiple drive signals.

The input signal is an electrical signal, or may be an audio signal, video signal, mixed signal of video and audio, and the like. The light source may be a fluorescent lamp, a light-emitting diode, a laser diode, and the like. In this embodiment, the input signal is, for example, an audio signal, and the light source is, for example, an ordinary LED lamp.

Figure 2:
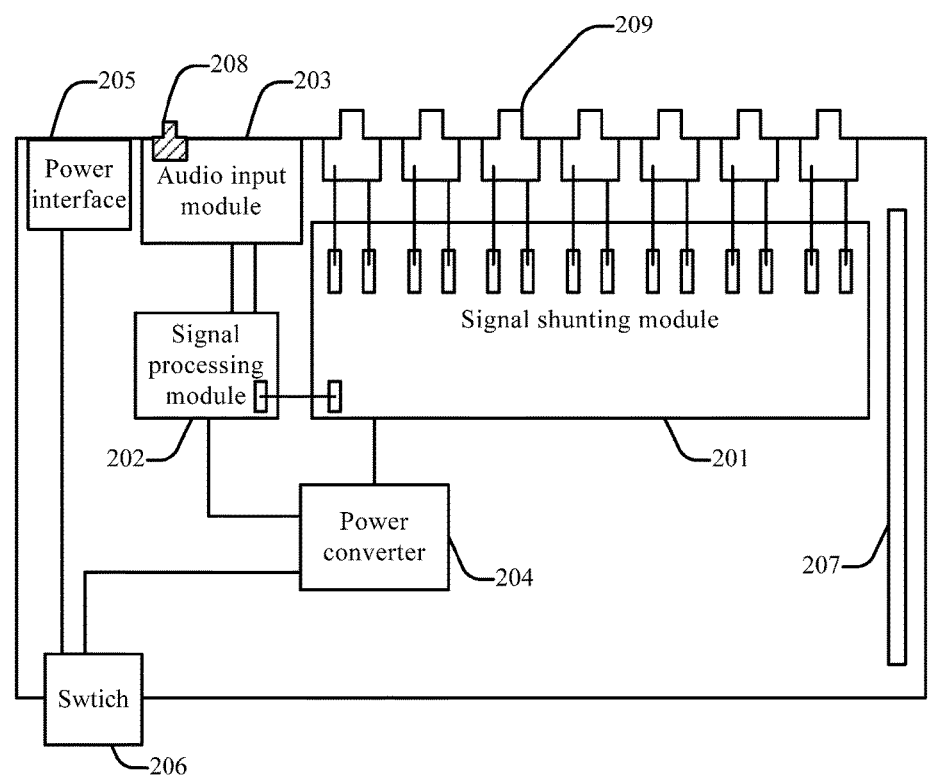
FIG. 2 is a structural block diagram of an encoder in FIG. 1.

FIG. 2 is a structural block diagram of the encoder 101. The encoder 101 includes an audio input interface 208, an audio input module 203, a signal processing module 202, a signal shunting module 201, and a signal output interface 209. The encoder 101 further includes a power interface 205 configured to supply power to an internal circuit, a power converter 204, a switch 206 configured to control power supply and disconnection, and a fan 207 configured to provide cooling.

The power converter 204 is connected to an external power source by using the switch 206 and the power interface 205, where the external power source is 220V alternating current. The power converter 204 is configured to convert the 220V alternating current to 5V direct current, and supply power to the signal shunting module 201, the signal processing module 202, and the fan 207. The fan 207 is configured for heat dissipation.

The audio input module 203 receives an audio signal by using the audio input interface 208 to implement input of the audio signal, and outputs the audio signal to the signal processing module 202. The audio input interface 208 is a standard video input interface (that is, an RCA interface), and is the most common audio and video terminal at present.

The signal processing module 202 is configured to perform analog-to-digital conversion and encoding on the audio signal, and output to the signal shunting module 201 an encoded signal that is converted to a digital signal and encoded.

The signal shunting module 201 shunts the encoded signal to multiple synchronous encoded signals. In this embodiment, the signal shunting module 201 shunts an encoded signal to 128 same encoded signals. The signal shunting module 201 outputs the multiple encoded signals to the driver 102 by using the signal output interface 209. Preferably, the signal output interface 209 is a 9-pin D-type data interface (DB9) male interface.

In the foregoing embodiment, the audio input interface 208 and the audio input module 203 are described. However, the encoder 101 is not limited to processing an audio signal. As described above, an input signal is an electrical signal, or may be an audio signal, video signal, mixed signal of video and audio, and the like. Therefore, in an alternative embodiment, a corresponding input interface and input module can be used, so as to input a corresponding electrical signal.

Figure 3:
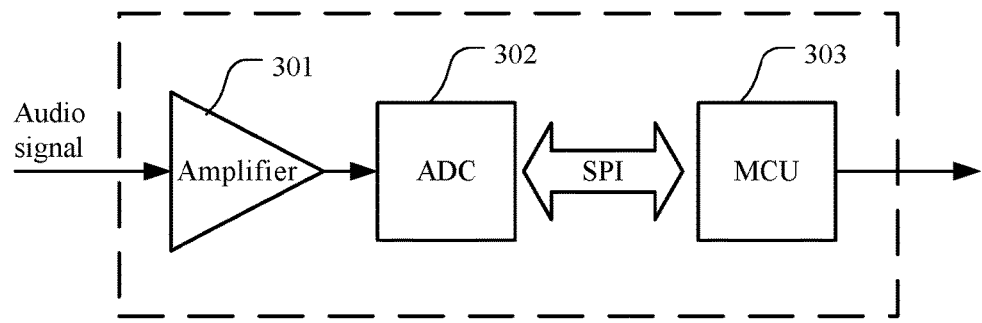
FIG. 3 is a structure block diagram of a signal processing module in FIG. 2.

FIG. 3 is a structure block diagram of the signal processing module 202. The signal processing module 202 includes an amplifier 301, an analog-to-digital converter (Analog to Digital Converter, ADC) 302, and a micro control unit (Micro Control Unit, MCU) 303. After amplified by the amplifier 301, an audio signal is converted to a digital signal by the analog-to-digital converter 302. The micro control unit 303 encodes the digital signal, to output an encoded signal. Preferably, the analog-to-digital converter 302 and the micro control unit 303 adopt a serial peripheral interface (Serial Peripheral Interface, SPI) protocol to achieve communication.

Figure 4:
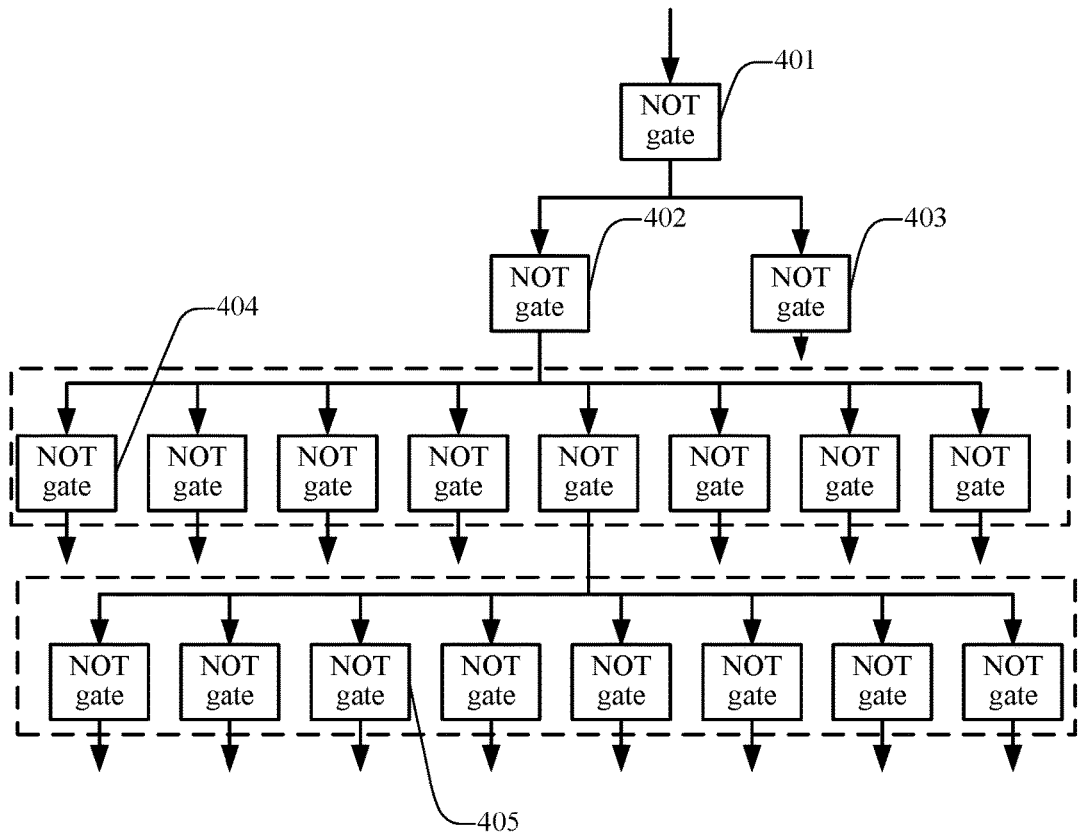
FIG. 4 is a structure block diagram of a signal shunting module in FIG. 2.

FIG. 4 is a structure block diagram of a signal shunting module. The signal shunting module has a multistage NOT-gate cascade structure. In this embodiment, the signal shunting module uses four-stage NOT gates to achieve the shunting function.

A first stage includes one NOT gate 401, configured to receive an encoded signal. A second stage includes two NOT gates: a NOT gate 402 and a NOT gate 403 that are connected to the preceding-stage NOT gate 401, so as to shunt the encoded signal to two encoded signals. A third stage includes 16 NOT gates 404: a first group of eight NOT gates that are connected to the preceding-stage NOT gate 402 and a second group of eight NOT gates that are connected to the preceding-stage NOT gate 403, so as to shunt the two encoded signals to 16 encoded signals. A fourth stage includes 128 NOT gates 405: every 8 gates area group, and there are 16 groups in total. Each NOT gate in each group is connected to a preceding-stage NOT gate, so as to shunt the 16 encoded signals to 128 encoded signals.

In the signal shunting module, one encoded signal is shunted to 128 encoded signals. Each encoded signal passes through a first-stage NOT gate to a fourth-stage NOT gate, four NOT gates in total, from an input end to an output end. Since delay of each NOT gate is the same, each output encoded signal is subjected to the same delay with respect to the encoded signal at the input end, thereby achieving shunt and synchronous modulation of multiple encoded signals.

Figure 5:
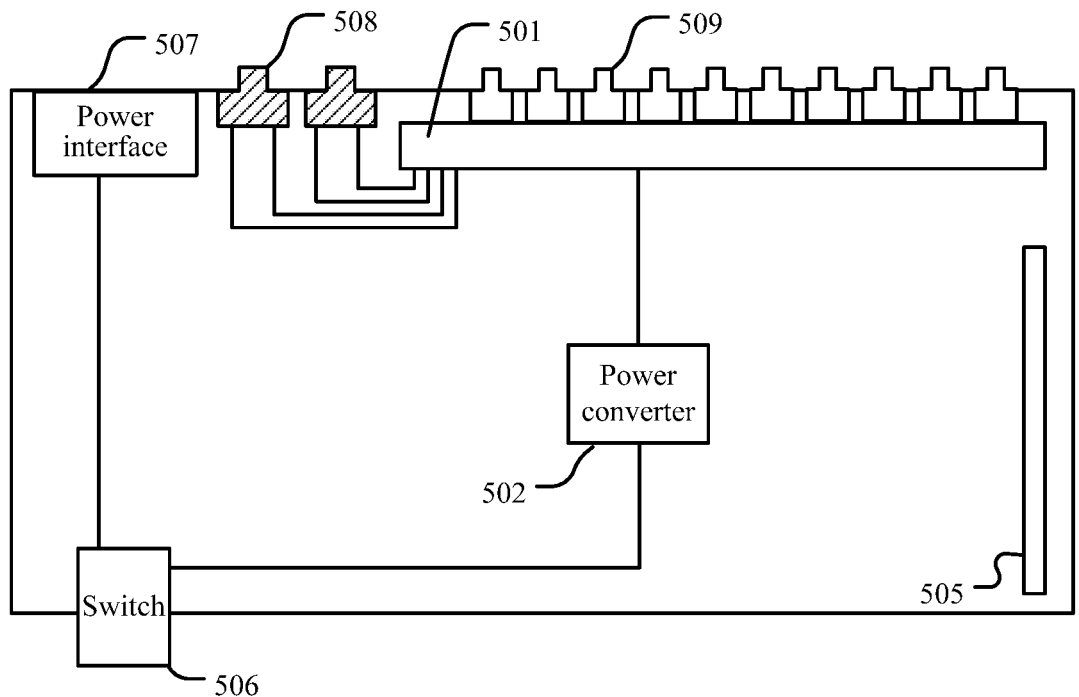
FIG. 5 is a structural block diagram of a driver in FIG. 1.

FIG. 5 is a structural block diagram of a driver. The driver includes a driver board 501, a signal input interface 508, and a signal output interface 509. The driver 102 may further include a power interface 507 configured to supply power to an internal circuit and a power converter 502, a switch 506 configured to control power supply and disconnection, and a fan 505 configured to provide cooling.

The power converter 502 is connected to an external power source of 220V alternating current by using the switch 506 and the power interface 507, and converts the 220V alternating current to 30V direct current, to supply power to the driver board 501.

The driver board 501 includes multiple LED drive units, configured to generate a drive signal according to an encoded signal. The signal input interface 508 consists of multiple DB9 male connectors, and the signal output interface 509 adopts multiple RCA female sockets. In one embodiment, the signal input interface 508 includes four DB9 male connectors, the driver board 501 includes 32 LED drive units, and the signal output interface 509 includes 32 RCA interfaces, so that the driver 102 can use four input signals to drive 32 light-emitting diodes.

Figure 6A:
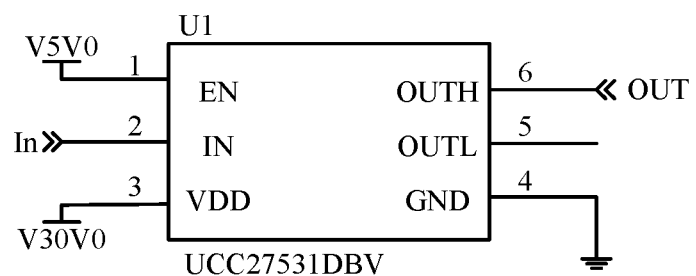
FIGS. 6a-6c are circuit diagram of an LED drive unit.
Figure 6B:
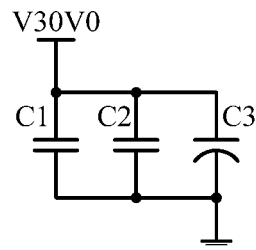
Figure 6C:
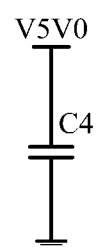

FIGS. 6a-6c are a circuit diagram of an LED drive unit U1 in a driver board 2101. In one embodiment, the LED drive unit U1 adopts a gate driver UCC27531DBV from Texas Instruments. An enable end EN of the gate driver UCC27531DBV is connected to 5V direct current, a VDD end is connected to 30V direct current, a GND end is grounded, an IN end is used as an input end, an OUTH end is used as an output end, and an OUTL end is left unused. A capacitor C4 is connected in series between 5V direct current and the ground, a capacitor C1, a capacitor C2, and a capacitor C3 are connected in parallel between 30V direct current and the ground. The capacitance of the capacitor C1 is 1 nF, the capacitance of the capacitor C2 is 0.1 μF, the capacitance of the capacitor C3 is 10 μF, and the capacitance of the capacitor C4 is 1 μF.

The enable end of the LED drive unit U1 is always at a high level. Multiple encoded signals are received from a signal input interface 2108, an encoded signal in the multiple encoded signals is transmitted to an input end of a corresponding LED drive unit U1, the encoded signal is amplified, and then an amplified signal is output from an output end.

The optical communication transmitting apparatus proposed by the present application can achieve a large optical signal coverage area by synchronously modulating and driving multiple visible light signal sources. In the optical communication transmitting apparatus, an encoder encodes and shunts an input signal. In a preferred embodiment, a signal shunting module is implemented by using cascaded NOT gates, so that each signal is subjected to same delay, thereby achieving shunt and synchronous modulation of multiple encoded signals. The optical communication transmitting apparatus resolves a problem in which optical signal coverage is limited in an existing optical communication system, and adopts an ordinary LED lamp as a light source, combines communication and lighting, and features a simple structure and easy implementation.

Figure 7:
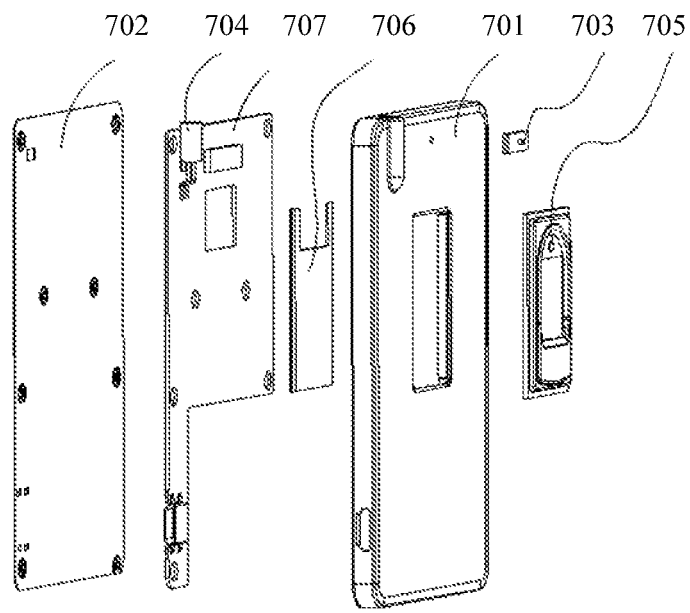
FIG. 7 is an explosive schematic structural diagram of a photon card according to a preferable embodiment of the present application.

A specific implementation example of the optical communication transmitting apparatus may be a photon card, a card-type light key used in an access control system. FIG. 7 is an explosive structural diagram of a photon card according to a preferable embodiment of the present application. The photon card includes a card-type housing composed of a panel 701 and a backplane 702, that is, the entire housing is in a rounded rectangle structure. A cavity is formed inside the housing. In FIG. 7, the upper part is the top of the photon card, and a circuit board 707 is packaged in the housing. On the circuit board 707, a luminous element configured to transmit a light beam carrying user identity information is arranged on the top of the photon card. The luminous element is preferably an LED lamp 704. The LED lamp 704 is electrically connected to the circuit board in a manner such as welding or bonding. An indicator light 703 is arranged, and uses an LED to operate as well. The photon card further includes a fingerprint collection module 705 located in the middle area. The fingerprint collection module 705 is electrically connected to related chip circuits in the circuit board 707. A silica-gel key 320 is arranged between the fingerprint collection module 705 and the circuit board 707. The silica-gel key 320 functions to provide a spring-back effect for the fingerprint collection module 705, so that the fingerprint collection module 705 does not access a circuit when not pressed, and is restored after pressed.

When using the photon card for authentication, a cardholder presses a finger on the fingerprint collection module 705, so that the fingerprint collection module 705 accesses a circuit and starts to work. Fingerprint information collected by the fingerprint collection module 705 is converted to an electrical signal and is compared with information stored in the related chips in the circuit for verification. After successful verification, the LED lamp 704 emits light and is driven by the related chips on the circuit board 707 to emit a light beam carrying identity information of the cardholder.

Because a manner of using a light beam carrying identity information is used, it is possible to achieve transmitting and receiving identity information without getting close to a reading device, thereby allowing a long distance operation, especially applicable to access control and identification.

Figure 8:
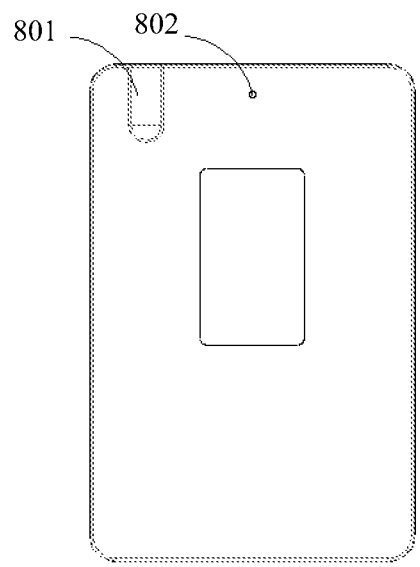
FIG. 8 is a schematic structural diagram of a panel of the photon card in FIG. 7.
Figure 9:
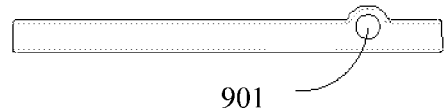
FIG. 9 is a schematic structural diagram of the top of the panel of the photon card in FIG. 7.

Further, specific structures of each component in the foregoing embodiments are described below. As shown in FIG. 8, FIG. 8 is a front schematic structural diagram of a panel 701 in the embodiment of FIG. 7. The panel is an unsealed shell made of metal or plastic. A rectangular through hole is milled in the middle part of the shell, and is used as a fingerprint collection module fitting hole. A shape and size of the hole is matched with a fingerprint collection module, so that the fingerprint collection module can be embedded in the surface of the shell. The panel is also provided with a small through hole used as an indicator light fitting hole 802, and a shape and size of the hole is the same as that of an indicator light. On the panel, a semicircular projection 801 is also formed corresponding to a location of the LED lamp on the circuit board. As shown in FIG. 9, the projection 801 functions to protect the LED lamp. On the entire panel, a projection is formed only on the location of the LED lamp, and other locations maintain a thinner structure, so as to achieve a reduced overall thickness of the photon card and a shape close to a card, thereby achieving easy carriage. By adopting the panel with such a structure, a cardholder can complete all operations only through a button, so that it is easy to operate.

Figure 10:
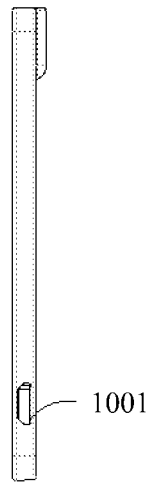
FIG. 10 is a schematic structural diagram of a side of the panel of the photon card in FIG. 7.

Preferably, as shown in FIG. 10, a charging hole 1001 is arranged on one side of the panel. A shape and location of the charging hole 1001 is matched with those of a charging interface on the circuit board. To ensure convenience of charging and ensure that the cardholder can easily find a suitable charging device, a charging interface adopts a standardized USB interface in this embodiment, and correspondingly, the charging hole 1001 is also set to a shape of a standard USB interface.

Figure 11:
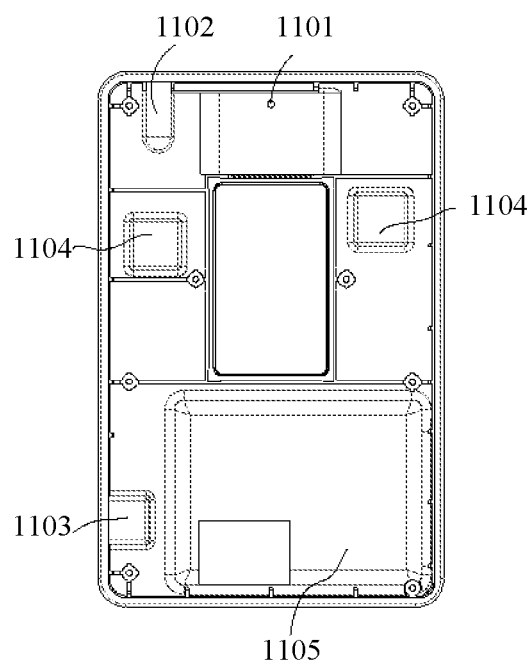
FIG. 11 is a schematic structural diagram of a photon card in which a panel is removed according to a preferable embodiment of the present application.

As shown in FIG. 11, FIG. 11 is a schematic structural diagram of a photon card in which a panel is removed according to the present application. It can be learnt from FIG. 11 that internal space of the housing is filled with the circuit board and a battery 1105. To make the whole space more compact, multiple chips 1104 on the circuit board are arranged in different areas of the circuit board, instead of being arranged in a centralized manner, so as to maximize internal space utilization rate, thereby reducing an overall volume of the photon card. As shown in FIG. 11, an LED lamp 1102 and an indicator light 1101 are arranged on the top of the circuit board. A bottom part is a USB interface 1103. In the middle part of the circuit board, the middle is a press area of the fingerprint collection module. Chips 1104 are arranged separately on two sides of the press area, so that components on the entire circuit board are in compact arrangement.

Preferably, the foregoing multiple chips may include the following type: a chip configured to convert a collected fingerprint to an encrypted electrical signal, a chip configured to drive an LED to emit light, or the like.

To minimize the volume of the photon card, in terms of a fixing method of an internal circuit board and the battery 1105, the circuit board and battery 1105 are fixed on the panel of the circuit board, rather than being processed at the edge of the circuit board. In the embodiment of FIG. 11, multiple locations of the circuit board and the battery 1105 are secured to the inside of the housing by using screws or rivets, and edges of the circuit board and the battery 1105 are fitted closely to the inside of the housing.

In the present application, the overall shape of the housing fits with components such as the internal circuit board to form a thin card shape. The thickness of the entire photon card is almost the same as the height of the USB interface, and the experience of carrying the card is similar to that of an existing induction-type card. In addition, a light beam carrying identity information is used for authentication, and an operation distance is much larger than that of an electromagnetic induction card, thereby having the advantage of long-distance identity verification.

Figure 12:
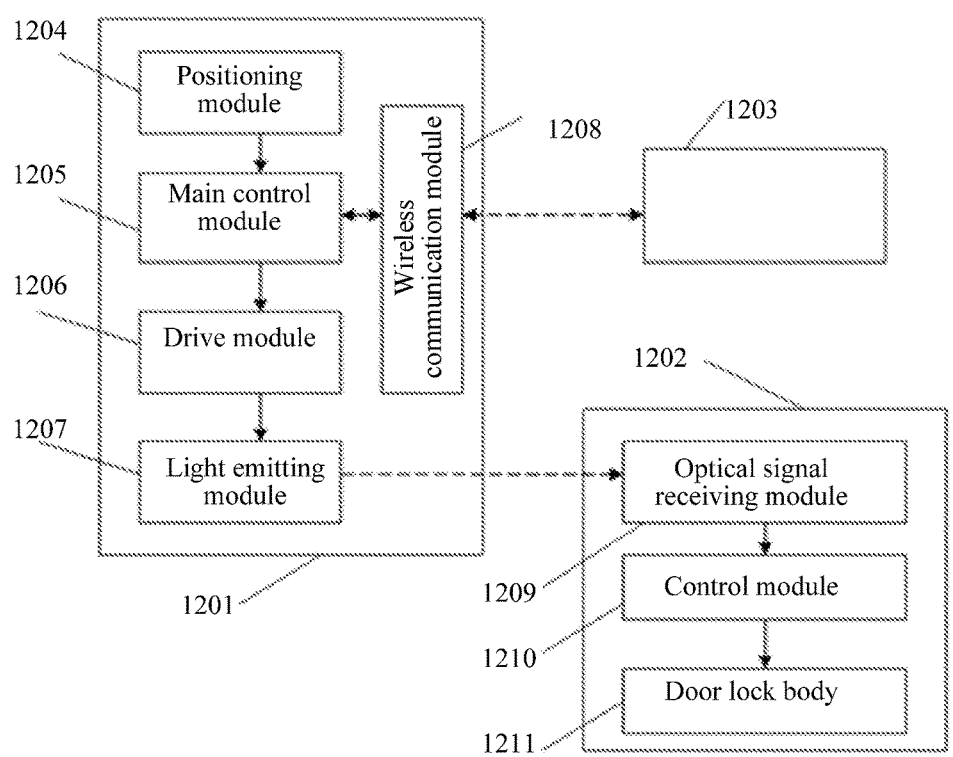
FIG. 12 is a schematic structural diagram of a light-controlled lock system according to a preferable embodiment of the present application.

As shown in FIG. 12, FIG. 12 is a schematic structural diagram of a light-controlled lock system according to the present application. The system includes a light key 1201, an intelligent terminal 1203, and a door lock 1202. The light key 1201 includes a positioning module 1204, a light emitting module 1207, a main control module 1205, a drive module 1206, and a wireless communication module 1208. The door lock includes an optical signal receiving module 1209, a control module 1210, and a door lock body 1211. The main control module 1205 controls the drive module 1206 to drive the light emitting module 1207 to transmit an optical signal including information; the positioning module 1204 is configured to collect location information of the light key; the main control module 1205 controls the wireless communication module 1208 to transmit the location information to the intelligent terminal 1203; and the intelligent terminal 1203 is configured to receive the location information transmitted by the wireless communication module 1208 and display the location information. The light key 1201 of this embodiment is preferably a light key worn by a child, and a user of the intelligent terminal 1203 is a parent (a guardian, a teacher or the like). In one embodiment, the intelligent terminal 1203 is a mobile phone, and a parent is informed of current location information of a child by viewing a location map displayed by the mobile phone. The wireless communication module may also transmit other information related to the light key. Such information may be property information of the light key, relevant information of the light key holder, or the like.

Figure 13:
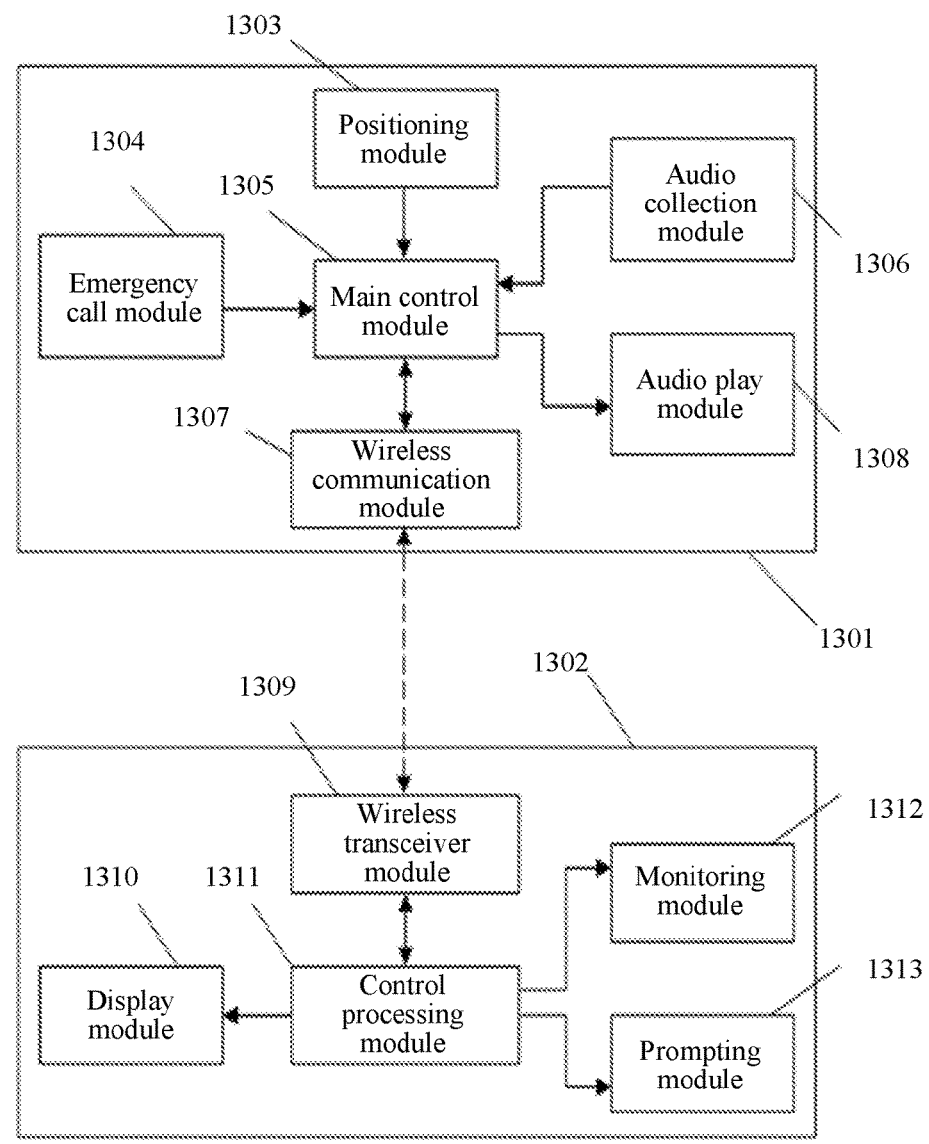
FIG. 13 is a schematic diagram showing a relationship between a light key and an intelligent terminal of a light-controlled lock system according to a preferable embodiment of the present application.

As shown in FIG. 13, FIG. 13 is a schematic diagram showing a relationship between a light key and an intelligent terminal of a light-controlled lock system according to the present application. With reference to FIG. 12 and FIG. 13, in one embodiment, a wireless transceiver module 1309 of an intelligent terminal 1302 is configured to receive location information transmitted by a wireless communication module 1307 and send the location information to a control processing module 1311. In addition to the wireless transceiver module 1309, the intelligent terminal 1302 includes a historical track module (not shown in the figure). The historical track module is connected to the control processing module 1311, and configured to calculate a historical track of a location of a light key 1301 within a predetermined period of time on the basis of the location information sent by the wireless communication module 1307. The control processing module 1311 controls a display module 1310 to display the historical track of the location of the light key 1301 within the predetermined period of time. In this way, the parent can inquire about the child's activity trace at any time.

In one embodiment, the light key 1301 also includes an emergency call module 1304, configured to generate a distress signal. A main control module 1305 controls the wireless communication module 1307 to send the distress signal to the wireless transceiver module 1309 of the intelligent terminal 1302. The control processing module 1311 controls a prompting module 1313 to respond according to the emergency distress signal. In one embodiment, the light-controlled lock system further includes at least one standby mobile terminal. After the emergency call module 1304 is enabled, the main control module 1305 is further configured to control the wireless communication module 1307 to send a distress signal to the standby mobile terminal when a prestored intelligent terminal does not respond to the emergency distress signal. In one embodiment, the emergency call module 1304 is set to an SOS button. In a dangerous situation, a child only needs to long press the SOS button, and then calls preset numbers in turn until a contact is made, and meanwhile, location information will be sent to parents in a form of SMS, WeChat, QQ information, or the like.

In one embodiment, the intelligent terminal 1302 also includes a monitoring module 1312, and the light key 1301 also includes an audio collection module 1306, configured to collect audio information from the light key 1301 within a predetermined range. The main control module 1305 controls the wireless communication module 1307 to send the audio information to the wireless transceiver module 1309. The control processing module 1311 controls the monitoring module 1312 to play a corresponding sound according to the audio information. Multiple intelligent terminals may be set to monitor and manage a light key 1301, so as to prevent from being unable to reach a single monitoring number due to an abnormal condition. In one embodiment, after a monitoring function is enabled, a parent carrying the intelligent terminal 1302 can hear a sound within 10 meters of the light key 1301 and can know an environmental condition of a child in real time.

In one embodiment, the intelligent terminal 1302 also includes a safe distance module (not shown in the figure). The safe distance module is connected to the main control module 1305 and configured to determine whether the light key 1301 is within a predetermined distance range based on the location information, and generate prompting information when the light key 1301 is out of the predetermined distance range. For example, in a crowded place, such as a shopping mall, a square, a downtown, or a subway station, once a child moves beyond the safe distance, the safe distance module will generate prompting information (such as playing a prompt by using sound equipment, such as a speaker or buzzer), to prevent the child from getting lost. For children of a relatively small age, a safe area is set to a range in which the intelligent terminal 1302 serves as the center with a radius of 50 meters, and the range is gradually increased as the age increases. When a child is at home, the safe area is set to a range in which the intelligent terminal serves as the center with a radius of 100 meters, and in a crowded downtown environment, the safe area will be adjusted to 20 meters.

In one embodiment, the control processing module 1311 calculates movement steps of a child within a predetermined time based on location information of the child within the predetermined time, and controls the display module 1310 to display corresponding movement steps. By checking daily movement steps of the child, the parent can encourage the child to exercise when the child does not exercise regularly.

In one embodiment, the intelligent terminal 1302 also includes a step counting management module (not shown in the figure), connected to the control processing module 1311. The light key 1301 further includes a movement step counting module (not shown in the figure), configured to collect movement steps of a holder carrying the light key 1301 within a predetermined time. The main control module 1305 controls the wireless communication module 1307 to transmit movement step information to the wireless transceiver module 1309, and further, the control processing module 1311 controls the display module 1310 to display corresponding movement steps. By checking daily movement steps of the child, the parent can encourage the child to exercise when the child does not exercise regularly.

In one embodiment, the intelligent terminal 1302 also includes an information editing module (not shown in the figure, the information editing module is connected to the control processing module 1311). The light key 1301 also includes an audio play module 1308; the information editing module is configured to generate text information; the main control module 1305 controls the wireless communication module 1307 to send the text information to the wireless transceiver module 1309; the audio play module is configured to receive the text information, and convert the text information to voice and play the voice; or the information editing module is configured to generate voice information; the main control module 1305 controls the wireless communication module 1307 to transmit the voice information to the wireless transceiver module 1309; and a prompting module is configured to receive the voice information and play the voice.

In a preferred embodiment of the present application, the light-controlled lock system has all of the above functions. In addition, the parent can also turn off an unwanted function through settings.

The light key can be made into a thin card, such as a campus one-card, and it is convenient for children and students to carry. The surface of the card can be provided with touch keys, such as "SOS emergency call", "push-to-talk", or "movement step counting" according to situations, so that children can accurately distinguish.

Figure 14:
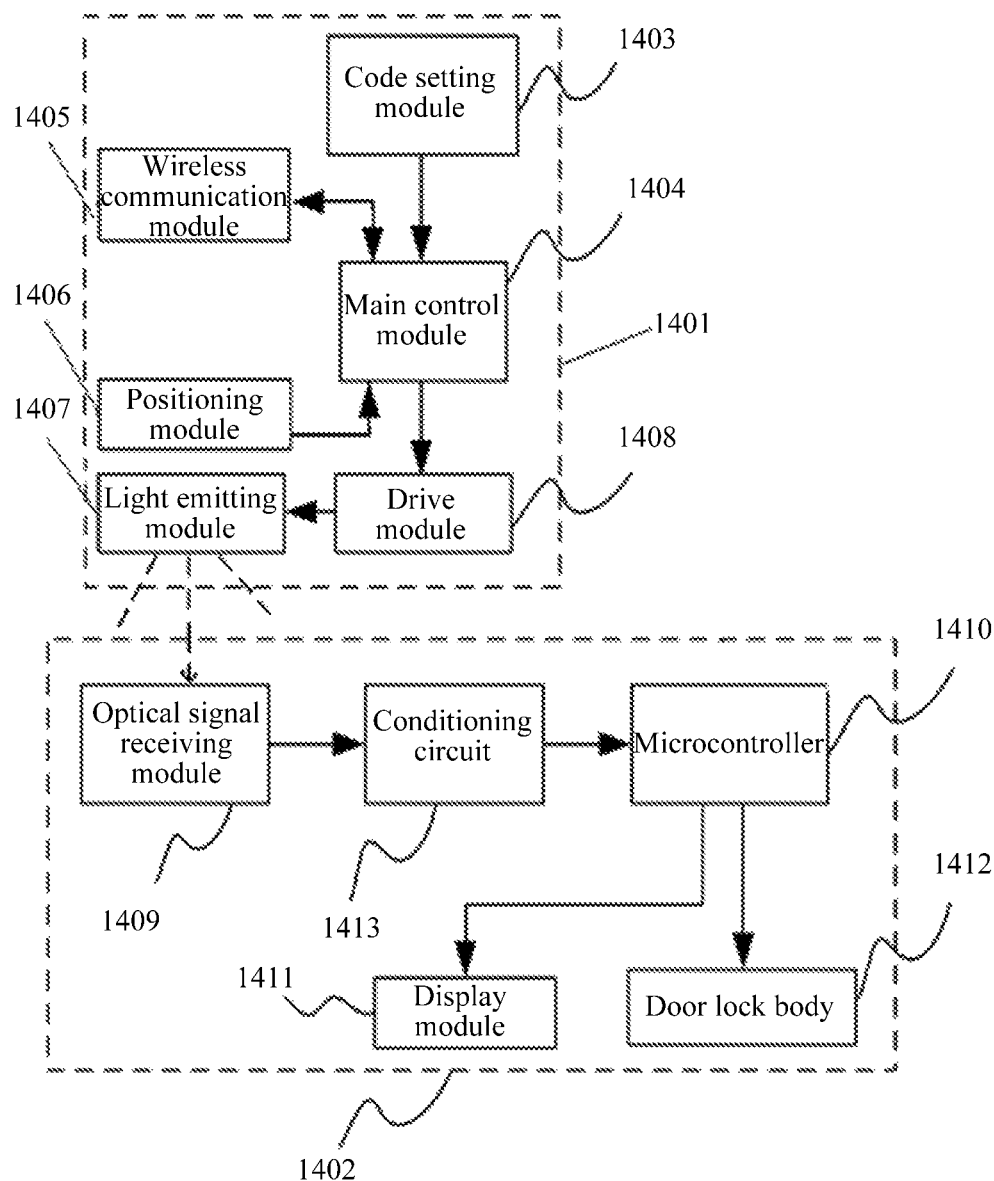
FIG. 14 is a schematic diagram showing a relationship between a light key and a door lock of a light-controlled lock system according to a preferable embodiment of the present application.

As shown in FIG. 14, FIG. 14 is a schematic diagram showing a relationship between a light key and a door lock of a light-controlled lock system according to the present application. In addition to a positioning module 1406 and a wireless communication module 1405, a light key 1401 further includes a light emitting module 1407, configured to emit an optical signal including information. Moreover, the light key 1401 further includes a code setting module 1403, a main control module 1404, and a drive module 1408. The code setting module 1403 is configured to set an unlock code. The code setting module 1403 may be a touch-tone information input module or a touchscreen or the like. The main control module 1404 is configured to receive code information transmitted from the code setting module 1403, form encoded data according to the code information, and store the encoded data in a memory of the main control module 1404. Under the control of a level modulation signal of the main control module 1404, the drive module 1408 drives the light emitting module 1407 to emit an optical signal including information.

The light emitted by the light emitting module 1407 may be visible or invisible. In this embodiment, the light emitting module 1407 is a light-emitting diode capable of emitting visible light, which, driven by the drive module 1408, flashes constantly at a high speed to form optical signals representing 0 and 1 signals. Therefore, the apparatus of the present application can provide illumination while communicating. The light-emitting diode is a semiconductor light source, features high brightness, high reliability, low energy loss, small size, and environment friendliness, and has advantages such as excellent modulation performance, high sensitivity of response, and the like.

A door lock 1402 includes an optical signal receiving module 1409, a door lock body 1412, a conditioning circuit 303, a microcontroller 1410 (that is, a control module), and a display module 1411. The optical signal receiving module 1409 is configured to receive an optical signal and control the door lock body 1412 to be opened or closed. After receiving an optical signal, the optical signal receiving module 1409 converts the optical signal to a current signal; the conditioning circuit 303 is configured to convert the current signal to a voltage signal and amplify the voltage signal, so as to restore original data; the microcontroller 1410 is configured to control the door lock body 1412 according to the voltage signal output by the conditioning circuit 303; and the door lock body is constituted by components such as a relay, a motor, and a locking bolt connected to a motor drive. The door lock body 1412 is the prior art, and will not be described repeatedly herein. The display module 1411 is configured to display the number of times the door lock body 1412 is opened or closed.

The code setting module 1403 is provided with an unlock key. When the unlock key is pressed, the main control module 1404 is triggered by the unlock key to send a level modulation signal to the drive module 1408. Under the control of the level modulation signal, the drive module 1408 drives the light emitting module 1407 to emit an optical signal including information.

The microcontroller 1410 stores standard data for comparison with data transmitted from the light key 1401. After the microcontroller 1410 receives the data transmitted from the light key 1401, the data is compared with the standard data in the microcontroller 1410. If the standard data in the microcontroller 1410 matches the received data, the microcontroller 1410 controls the door lock body 1412 to unlock. If the data received by the microcontroller 1410 does not match the standard data stored therein, it is determined whether the data is new code data set by the code setting module 1403. If the data is the new code data, original standard data is replaced with the new code data, and the new code data is stored as the standard data in the microprocessor 1410, and if the data is not the new code data, the door will not open.

By using the light-controlled lock system of this embodiment, as long as a child carries the light key, a parent can grasp current location information, historical track information, and the like of the child in real time, monitor sounds around the child, and get an alarm when a location of the child moves beyond a preset safe distance. The child can open the emergency call function when faced with danger. If necessary, the parent can talk to the child. By means of the series of practical functions, safety of children can be largely guaranteed, and light key management and child safety management can be implemented at the same time. In addition, when the light key is lost, it can be found by using GPS positioning information thereof, thereby avoiding security risks and economic losses.

Figure 15:
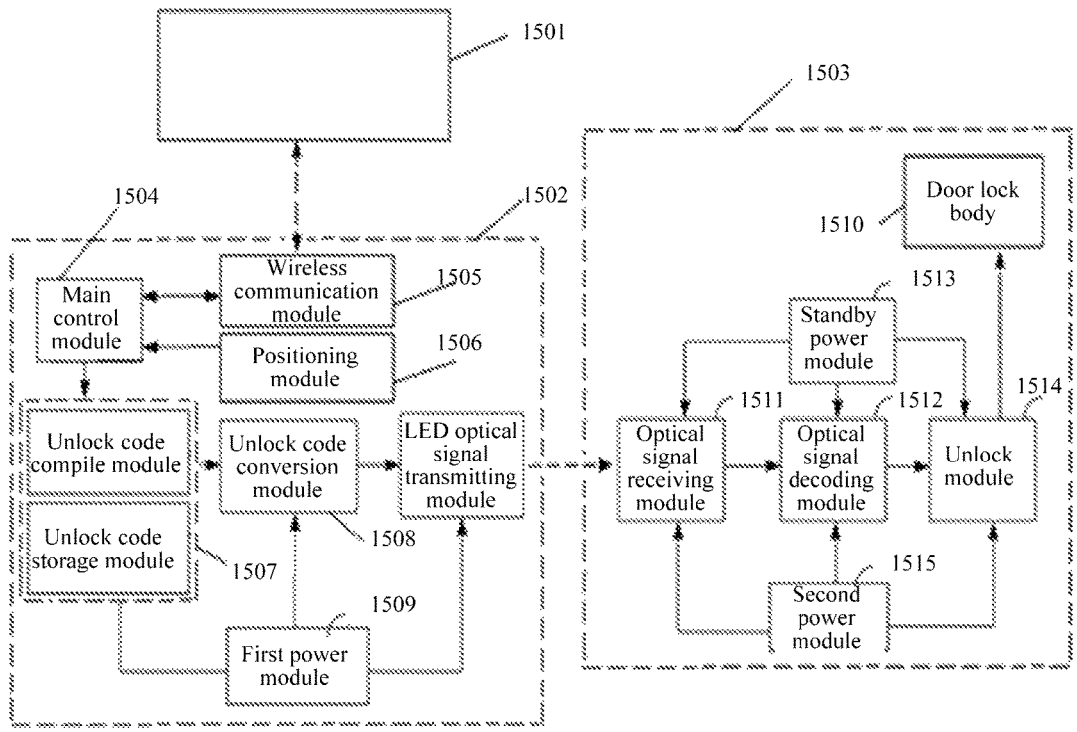
FIG. 15 is a schematic structural diagram of a light-controlled lock system according to a preferable embodiment of the present application.

As shown in FIG. 15, FIG. 15 is a schematic structural diagram of a light-controlled lock system according to the embodiment. The system includes a light key 1502, a light-controlled electronic lock 1503, and at least one intelligent terminal 1501. The light key 1502 outputs an LED optical signal, and the light-controlled electronic lock 1503 receives the LED optical signal, and determines whether to lock or unlock. A positioning module 1506 of the light key 1502 is configured to collect location information of the light key 1502; a main control module 1504 sends the location information to the intelligent terminal 1501 by using a wireless communication module 1505; and the intelligent terminal 1501 is configured to receive the location information and display the location information.

In one embodiment, a wireless transceiver module of an intelligent terminal 1501 receives location information sent by a wireless communication module 1505 and sends the location information to a control processing module. In addition to the wireless transceiver module, the intelligent terminal 1501 includes a historical track module. The historical track module is connected to the control processing module, and configured to calculate a historical track of a location of the light key within a predetermined period of time on the basis of the location information sent by the wireless communication module 1505. The control processing module controls a display module to display the historical track of the location of the light key within the predetermined period of time. In this way, the parent can inquire about the child's activity trace at any time.

In one embodiment, the light key also includes an emergency call module, configured to generate a distress signal. The main control module 1504 controls the wireless communication module 1505 to send the distress signal to the wireless transceiver module of the intelligent terminal 1501. The control processing module controls a prompting module to respond according to the emergency distress signal. In one embodiment, the light-controlled lock system further includes at least one standby mobile terminal. After the emergency call module is enabled, the main control module 1504 is further configured to control the wireless communication module 1505 to send a distress signal to the standby mobile terminal when a prestored intelligent terminal 1501 does not respond to the emergency distress signal. In one embodiment, the emergency call module is set to an SOS button. In a dangerous situation, a child only needs to long press the SOS button, and then calls preset numbers in turn until a contact is made, and meanwhile, location information will be sent to parents in a form of SMS, WeChat, QQ information, or the like.

In one embodiment, the intelligent terminal 1501 also includes a monitoring module, and the light key also includes an audio collection module, configured to collect audio information within a predetermined range from the light key. The main control module 1504 controls the wireless communication module 1505 to send the audio information to the wireless transceiver module. The control processing module controls the monitoring module to play a corresponding sound according to the audio information. Multiple intelligent terminals 1501 may be set to monitor and manage a light key, so as to prevent from being unable to reach a single monitoring number due to an abnormal condition. In one embodiment, after a monitoring function is enabled, a parent carrying the intelligent terminal 1501 can hear a sound within 10 meters of the light key and can know an environmental condition of a child in real time.

In one embodiment, the intelligent terminal 1501 also includes a safe distance module (not shown in the figure). The safe distance module is connected to the main control module 1504 and configured to determine whether the light key is within a predetermined distance range based on the location information, and generate prompting information when the light key is out of the predetermined distance range. For example, in a crowded place, such as a shopping mall, a square, a downtown, or a subway station, once a child moves beyond the safe distance, the safe distance module will generate prompting information (such as playing a prompt by using sound equipment, such as a speaker or buzzer), to prevent the child from getting lost. For children of a relatively small age, a safe area is set to a range in which the intelligent terminal 1501 serves as the center with a radius of 50 meters, and the range is gradually increased as the age increases. When a child is at home, the safe area is set to a range in which the intelligent terminal serves as the center with a radius of 100 meters, and in a crowded downtown environment, the safe area will be adjusted to 20 meters.

In one embodiment, the control processing module calculates movement steps of a child within a predetermined time based on location information of the child within the predetermined time, and controls the display module to display corresponding movement steps. By checking daily movement steps of the child, the parent can encourage the child to exercise when the child does not exercise regularly.

In one embodiment, the intelligent terminal 1501 also includes a step counting management module (not shown in the figure), connected to the control processing module. The light key further includes a movement step counting module (not shown in the figure), configured to collect movement steps of a holder carrying the light key within a predetermined time. The main control module 1504 controls the wireless communication module 1505 to transmit movement step information to the wireless transceiver module and further, the control processing module controls the display module to display corresponding movement steps. By checking daily movement steps of the child, the parent can encourage the child to exercise when the child does not exercise regularly.

In one embodiment, the intelligent terminal 1501 also includes an information editing module (not shown in the figure, the information editing module is connected to the control processing module). The light key also includes an audio play module; the information editing module is configured to generate text information; the main control module 1504 controls the wireless communication module 1505 to send the text information to a wireless transceiver module 1505; the audio play module is configured to receive the text information, and convert the text information to voice and play the voice; or the information editing module is configured to generate voice information; the main control module 1504 controls the wireless communication module 1505 to transmit the voice information to the wireless transceiver module 1505; and a prompting module is configured to receive the voice information and play the voice. Alternatively, the information editing module also generates image information (such as photos and images), and the main control module 1504 controls the wireless communication module 1505 to transmit the image information to the wireless transceiver module 1505; and the prompting module is configured to receive the image information and display the image.

In a preferred embodiment of the present application, the light-controlled lock system has all of the above functions. In addition, the parent can also turn off an unwanted function through settings.

The light key can be made into a thin card, such as a campus one-card, and it is convenient for children and students to carry. The surface of the card can be provided with touch keys, such as "SOS emergency call", "push-to-talk", or "movement step counting" according to situations, so that children can accurately distinguish.

The light key 1502 may simply output LED lamp flashing at a certain frequency, and the LED lamp flashing at a certain frequency forms an unlock code. At the same time, the light key 1502 may also receive user's information and encode it into a binary digital code. The light key 1502 outputs the LED lamp flashing at a certain frequency and corresponding to the binary digital code, and the user's information may be user fingerprint, user voice, user pupil information, and the like. A manner of outputting the LED lamp flashing at a certain frequency and corresponding to the binary digital code may be that, for example, "1" in the binary digital code represents that the LED lamp is on, and "0" represents that the LED lamp is off. Conceivably, the above states of the LED lamp corresponding to "1" and "0" may be the opposite.

The main control module 1504 of the light key 1502 may control a cryptographic unit 1507 to generate a code for opening the light-controlled lock. The light key also includes an unlock code conversion module 1508 configured to convert the unlock code to an LED optical signal, an LED optical signal wireless communication module 13 configured to transmit the LED optical signal converted by the unlock code conversion module 1508, and a first power module 1509 configured to supply power to the main control module 1504, the unlock code conversion module 1508, the LED optical signal wireless communication module 13, and the like.

The cryptographic unit 1507 includes an unlock code compile module configured to generate an unlock code through compilation, and an unlock code storage module configured to store an unlock code input beforehand. In this embodiment, two unlock code generation modules are arranged, which correspond to different unlock methods. If a user uses user information, such as user fingerprint or user voice, as the unlock code, the user information is first converted to a binary digital code by using the code compile module, and the binary digital code is converted to an LED optical signal by using the conversion module 1508. If the user uses a binary digital code stored therein as the unlock code, after the user enables the light key 1502, the unlock code storage module converts the stored binary digital code to an LED optical signal by using the unlock code conversion module 1508.

It should be noted that the light key 1502 of the embodiment of the present application may be used alone as a device or may be integrated into an LED-mounted device such as a mobile phone, a tablet, or the like.

The light-controlled electronic lock 1503 includes an optical signal receiving module 1511 configured to receive an LED optical signal, a control module, and a door lock body 1510. The control module includes an optical signal decoding module 1512 configured to decode the LED optical signal received by the LED optical signal receiving module 1511 into binary data, an unlock module 1514 configured to unlock the light-controlled electronic lock according to the binary data decoded by the optical signal decoding module 1512, and a second power module 1515 configured to supply power to the optical signal receiving module 1511, the optical signal decoding module 1512, and the unlock module 1514. The control module further includes a standby power module 1513 used for the second power module 1515.

In the embodiment of the present application, the light-controlled electronic lock 1503 decodes the LED optical signal after receiving the LED optical signal. The decoding process is: first converting the LED optical signal to a current signal; then converting the current signal to a voltage signal, where when the voltage is high (rising edge), such as 5V or 3.3V, it indicates a rising edge of a digital signal, and when the voltage is low (falling edge), that is 0V, it indicates low level of the digital signal; and digital signals of high and low levels forming binary data after decoded by Manchester. The binary data is compared with binary data stored inside the light-controlled electronic lock, and the light-controlled electronic lock is opened when the binary data is the same.

Meanwhile, the present application also provides the standby power module 1513. Since power sources for operation of the light-controlled electronic lock 1503 are electric energy, the light-controlled electronic lock 1503 will not work during a power failure. The standby power module 1513 may be a storage battery, or may also be a storage module in another form. In case of an outage, the standby power module 1513 powers the light-controlled electronic lock. When the mains power is restored, the standby power module 1513 is disconnected automatically to save power.

The present application uses an optical signal to control a lock. Since a user can see an irradiation range of visible light, an LED optical signal can be accurately transmitted, and there is no need to worry about interception of the LED optical signal and code leakage; therefore, the security and user experience are greatly improved.

According to comparison of FIG. 14 and FIG. 15, differences between this embodiment and embodiment 1 are mainly based on circuit structure designs of the light key 1502 and the light-controlled electronic lock 1503. For the cryptographic unit 1507 in embodiment 2, user information is first converted to a binary digital code by using the code compile module, and the binary digital code is converted to an LED optical signal by using the conversion module 1508. This highlights a code compilation and conversion process. The code setting module of embodiment 1 is provided with an unlock key, and when the unlock key is pressed, the main control module is triggered by the unlock key to send a level modulation signal to the drive module according to encoded data, and the drive module drives, under the control of the level modulation signal, the light emitting module to emit an optical signal including information. This highlights an effect of the unlock key, and prevents a door from being opened when the user does not want to open the door. Embodiment 2 also highlights an effect of the standby power module 1513 cooperating with the second power module 1515. In case of an outage, the standby power module 1513 powers the light-controlled electronic lock. When the mains power is restored, the standby power module 1513 is disconnected automatically to save power. In this way, normal working of the door lock system can be ensured.

According to another aspect of the present application, an optical communication receiving apparatus is provided. The optical communication receiving apparatus, for example, a light-controlled lock, or a light-controlled showcase, is configured to respond to the above-described optical communication transmitting apparatus, and execute corresponding actions. The core is a photoelectric conversion circuit set inside the optical communication receiving apparatus.

Figure 16:
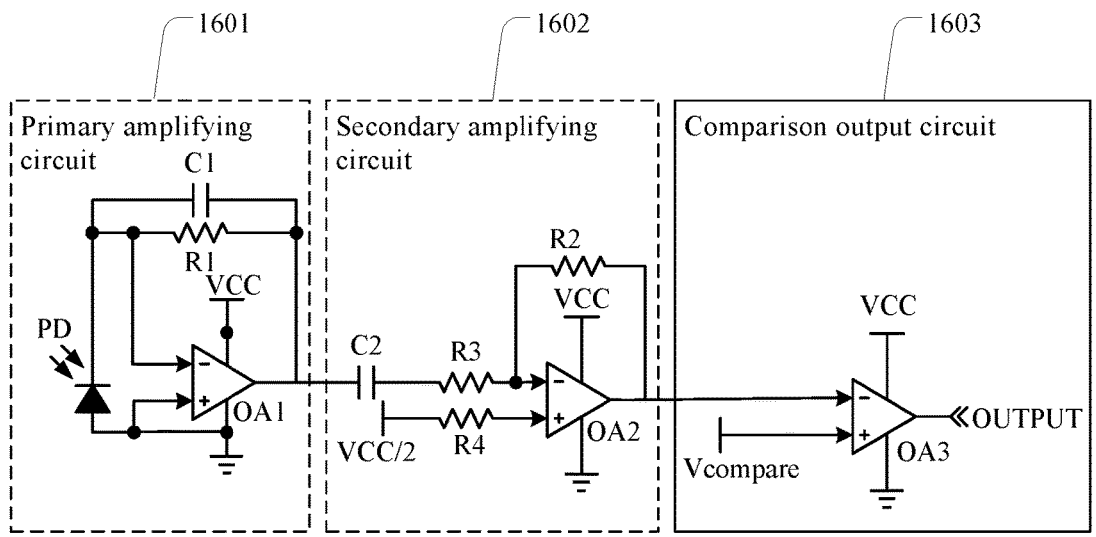
FIG. 16 is a schematic circuit diagram of a photoelectric conversion circuit according to a preferable embodiment of the present application.

FIG. 16 is a schematic circuit diagram of a photoelectric conversion circuit according to the present application. The photoelectric conversion circuit includes a primary amplifying circuit 1601, a secondary amplifying circuit 1602, and a comparison output circuit 1603, where the circuit includes components, such as a photodiode, an operational amplifier, a resistor, and a capacitor.

The primary amplifying circuit 1601 includes an operational amplifier OA1 receiving single power supply VCC and works in a single-ended operation mode. An in-phase input is grounded, an anti-phase input end receives light current, and an output end outputs Vout1.

The primary amplifying circuit 1601 also includes a photodiode PD, a resistor R1, and a capacitor C1.

An anode terminal of the photodiode PD is connected to the in-phase input end of the operational amplifier OA1, and both are grounded; and a cathode terminal of the photodiode PD is connected to the anti-phase input end of the operational amplifier OA1, a first end of the resistor R1, and a first end of the capacitor C1.

The first end of the resistor R1 and the first end of the capacitor C1 are connected to the anti-phase input end of the operational amplifier OA1, and a second end of the resistor R1 and a second end of the capacitor C1 are connected to the output end of the operational amplifier OA1.

In the primary amplifying circuit 1601, the photodiode PD is configured to implement receiving an optical signal, the optical signal is converted to a current signal, and the current signal is input to the operational amplifier OA1. The OA1, the resistor R1, and the capacitor C1 form a trans-impedance amplified circuit to convert the current signal to a voltage signal, and then the voltage signal is output to the secondary amplifying circuit 102. A magnification times from the current signal to the voltage signal can be adjusted by adjusting the R1, and ripple of a signal can be suppressed by adjusting the C1.

In a preferred embodiment, multiple photodiodes PD may be used to form an array to enhance the light current.

The secondary amplifying circuit 1602 includes an operational amplifier OA2 receiving single power supply VCC and working in a single-ended operation mode. An anti-phase input end receives Vout1 output by the primary amplifying circuit, an in-phase input receives voltage VCC/2, and an output end outputs Vout2.

The secondary amplifying circuit 1602 also includes a capacitor C2 and resistors R2-R4. The capacitor C2 and the resistor R3 are connected in series between the output end Vout1 of the primary amplifying circuit 1601 and the anti-phase input end of the operational amplifier OA2; the resistor R2 is connected between the anti-phase input end and the output end of the operational amplifier OA2; and the resistor R4 is connected between voltage VCC/2 and the in-phase input of the operational amplifier OA2.

The secondary amplifying circuit 1602 is configured to implement amplification of a voltage signal. The capacitor C2 performs high-pass filtering on an input voltage signal, and cut-off frequency of the high-pass filtering and a response speed to changes in ambient light intensity can be adjusted by adjusting C2. Amplification of a signal adopts reversed phase amplification, and a gain system can be adjusted by adjusting the resistors R2 and R3, where gain G=1+R2/R3. The resistor R4 is a balancing resistance, and a magnitude of the resistor R4 is a resistance value after R2 and R3 are in parallel connection.

The comparison output circuit 1603 includes an operational amplifier OA3 receiving single power supply VCC and working in a single-ended operation mode. An anti-phase input end receives Vout2 output by the secondary amplifying circuit 1602, an in-phase input receives comparison voltage Vcompare, and an output end outputs OUTPUT.

The comparison output circuit 1603 is configured to implement shaping of a voltage signal. A waveform of an output signal can be adjusted by adjusting Vcompare, and a shaped signal can be output to a processor for digital signal processing.

The operational amplifier-based photoelectric conversion circuit provided in the present application features simple structure, excellent performance, and low costs, satisfying the needs of non-aligned visible light communication and white light LED lamp communication.

Figure 17:
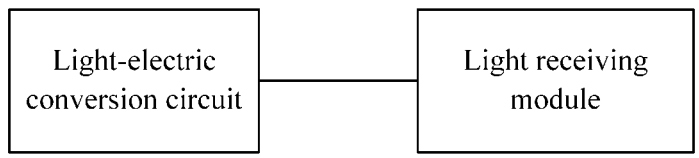
FIG. 17 is a schematic structural diagram of a photoelectric receiver according to a preferable embodiment of the present application.

FIG. 17 is a schematic structural diagram of a photoelectric receiver according to the present application. The photoelectric receiver includes a photoelectric conversion circuit and a light receiving module.

The photoelectric conversion circuit is configured to receive an optical signal and convert the optical signal to a voltage signal.

The light receiving module is configured to receive the voltage signal output by the photoelectric conversion circuit.

Figure 18:
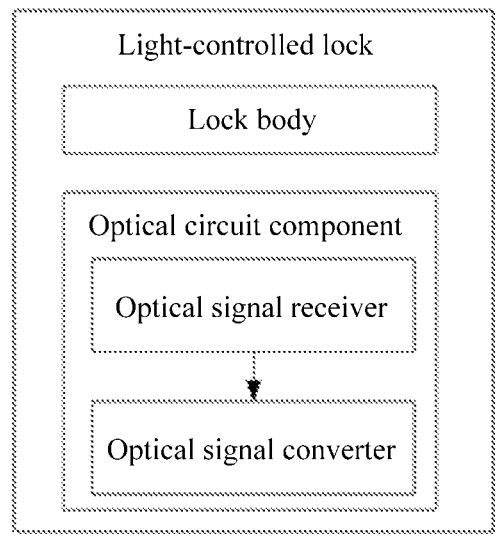
FIG. 18 is a schematic diagram of a functional model of a light-controlled lock according to a preferable embodiment of the present application.

As shown in FIG. 18, a light-controlled lock is provided in this application. In one embodiment, the light-controlled lock includes an optical circuit component and a lock body. The optical circuit component is configured to receive an optical signal transmitted by a light key, convert the optical signal to an unlocking signal, and output the unlocking signal to a driver of the lock body. The lock body includes a locking bolt, a lock latch, and the driver, where the driver is connected to the locking bolt, and configured to drive the locking bolt to exit from the lock latch after receiving the unlocking signal.

In one embodiment, the optical circuit component includes an optical signal receiver and an optical signal converter. The optical signal receiver is configured to receive an optical signal sent by a light key. The optical signal converter is configured to convert the optical signal to an unlocking signal, where the unlocking signal may include an unlock code. The unlock code may include biological information such as fingerprint, pulse, heartbeat, or iris, a character string, or the like. The foregoing optical signal receiver and the optical signal converter may be replaced with an optical-electrical converter. In another embodiment, the optical circuit component may further include a signal processor, configured to process an unlocking signal, to obtain information carried therein.

The light-controlled lock in this application may further include a controller, configured to receive an unlocking signal from an optical signal converter, and output the unlocking signal to the river of the lock body when an unlock code is correct. The showcase in this application may further include another receiver, such as an RF receiver and an infrared receiver, so as to be compatible with multiple methods to open the door.

In one embodiment, the light-controlled lock may further include a memory, configured to store an unlocking record and send the unlocking record to a server. The unlocking record may include an unlock code number and an unlocking time, and the unlocking record may also include other registered information about a person unlocking the lock, such as a name, a cell phone number, or a job. Because the unlock code number can respond to the person who uses the unlock code, it can be known that who opens the lock when the unlock code number is viewed. The light-controlled lock may further include a wireless transmitter, configured to send a wireless signal, so as to interact with or feed back to the person unlocking the lock.

The above-described light-controlled lock can be used for a variety of preservation occasions, and used a showcase and other equipment.

Figure 19:
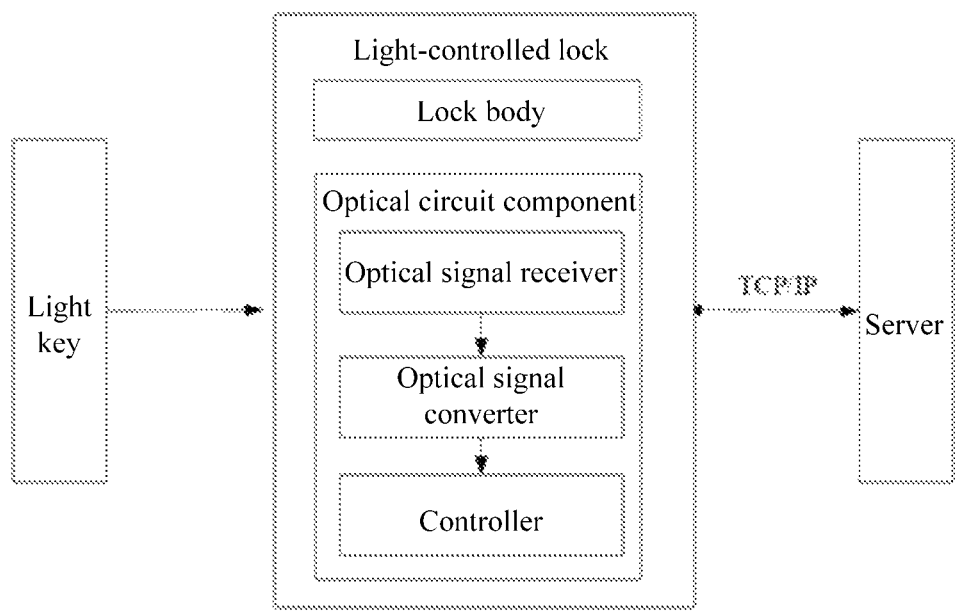
FIG. 19 is a schematic diagram of a functional model of a showcase system according to a preferable embodiment of the present application.

As shown in FIG. 19, a showcase system is provided in this application. In one embodiment, the showcase system includes a showcase and a light-controlled lock, where the light-controlled lock is arranged on the showcase. The showcase includes a cabinet, and the light-controlled lock includes an optical circuit component and a lock body. The optical circuit component is configured to receive an optical signal transmitted by a light key, convert the optical signal to an unlocking signal, and output the unlocking signal to a driver of the lock body. The lock body includes a locking bolt, a lock latch, and a driver, where the driver is connected to the locking bolt, and configured to drive the locking bolt to exit from the lock latch after receiving the unlocking signal.

The light-controlled lock in this application may further include a controller, configured to receive an unlocking signal from an optical signal converter, and output the unlocking signal to the river of the lock body when an unlock code is correct. The showcase in this application may further include another receiver, such as an RF receiver and an infrared receiver, so as to be compatible with multiple methods to open the door.

In one embodiment, the showcase system in this application may further include a server, configured to receive an unlocking signal from an optical signal converter, compare the unlocking signal with an unlock code prestored in the server, and output the unlocking signal to the controller when the unlock code is correct. The controller further drives the driver of the lock body to drive the locking bolt to exit from the lock latch. The light-controlled lock is further configured to determine, according to a comparison result, whether to make the locking bolt to exit from the lock latch, and send an unlocking record to the server. The server is further configured to receive the unlocking record. When the lock is unlocked in an abnormal manner, the server may inform a light key of the anomaly in a way of making the light key vibrate, or giving an alarm using an announciator on the light key.

In one embodiment, the optical circuit component includes an optical signal receiver and an optical signal converter. The optical signal receiver is configured to receive an optical signal sent by a light key. The optical signal converter is configured to convert the optical signal to an unlocking signal, where the unlocking signal may include an unlock code. The foregoing optical signal receiver and the optical signal converter may be replaced with an optical-electrical converter. In another embodiment, the optical circuit component may further include a signal processor, configured to process an unlocking signal, to obtain information carried therein. In one embodiment, the light-controlled lock may further include a memory, configured to store an unlocking record. The unlocking record may include an unlock code number, an unlocking time, and the like. The unlock code number can respond to the person who uses the unlock code, so that it can be known that who opens the lock when the unlock code number is viewed. Alternatively, the unlocking record is stored only in the server, or is stored in both the light-controlled lock and the server.

The showcase in this application can be used to display or sell a variety of commodities such as a jewelry display case, a cultural display case, a perfume display case, a valuables display case, or other display cases. In this embodiment, the showcase is a jewelry display case.

The server and the showcase can be connected through a TCP/IP protocol, and the server and the showcase can also be connected in a wireless manner such as WiFi, or Bluetooth.

The showcase in this application may further include a light key, where the light key includes a light emitting apparatus, configured to convert an unlocking signal to an optical signal, and send the optical signal to the light-controlled lock. The unlocking signal includes an unlock code, and the unlock code may include biological information such as fingerprint, pulse, heartbeat, or iris, a character string, or the like. The code sent by the light key must be saved on the server or/and the controller in advance. The light key may be a dedicated device, or a wearable device such as a hand ring, or a portable mobile electronic device such as a mobile phone, a PAD or a notebook.

What is claimed is:

1. An optical communication transmitting apparatus, comprising:
    an encoder, configured to encode and shunt an input signal, to generate multiple synchronous encoded signals;
    a driver, configured to amplify the multiple encoded signals, to generate multiple drive signals; and
    multiple light sources, configured to generate multiple synchronous optical signals when driven by the multiple drive signals;
    wherein the encoder is configured to execute program instructions, wherein the program instructions comprise: performing analog-to-digital conversion and encoding on the input signal, converting the input signal to an encoded signal, and converting the encoded signal to the multiple synchronous encoded signals;
    wherein the encoder comprises a multistage NOT-gate cascade structure;
    wherein each encoded signal passes through the same number of NOT gates from an input end of a first-stage NOT gate to an input end of a corresponding NOT gate of a last-stage NOT gate in the encoder;
    wherein the number of Kth-stage NOT gates is greater than that of K−1th-stage NOT gates in the encoder, each NOT gate in the K−1th-stage NOT gates is connected to at least one NOT gate in the Kth-stage NOT gates, and K is an integer greater than 2.

2. The optical communication transmitting apparatus according to claim 1, wherein the program instructions further comprise:
    amplifying the input signal;
    converting the input signal to a digital signal; and
    encoding the digital signal, to generate the encoded signal.

3. The optical communication transmitting apparatus according to claim 1, wherein the optical communication transmitting apparatus is a photon card, and the photon card further comprises:
    a housing;
    a circuit board fitted inside the housing; and
    the encoder, the driver, and the light sources are arranged on the circuit board;
    wherein the photon card is configured to collect a fingerprint from a surface of the housing and the circuit board is configured to drive the light sources to emit a light beam that carries user identity information.

4. The optical communication transmitting apparatus according to claim 3, wherein an indicator light is welded on the circuit board to indicate a working status of the photon card.

5. The optical communication transmitting apparatus according to claim 1, wherein the photon card is further configured to collect location information of the optical communication transmitting apparatus and transmit the location information.

6. The optical communication transmitting apparatus according to claim 5, wherein the photon card is further configured to generate a distress signal and transmit the distress signal.

* * * * *